A. J. BEACH, Dec'd.
C. E. BEACH, Administratrix.
RUNNING GEAR FOR VEHICLES.
No. 10,679. Reissued Jan. 19, 1886.
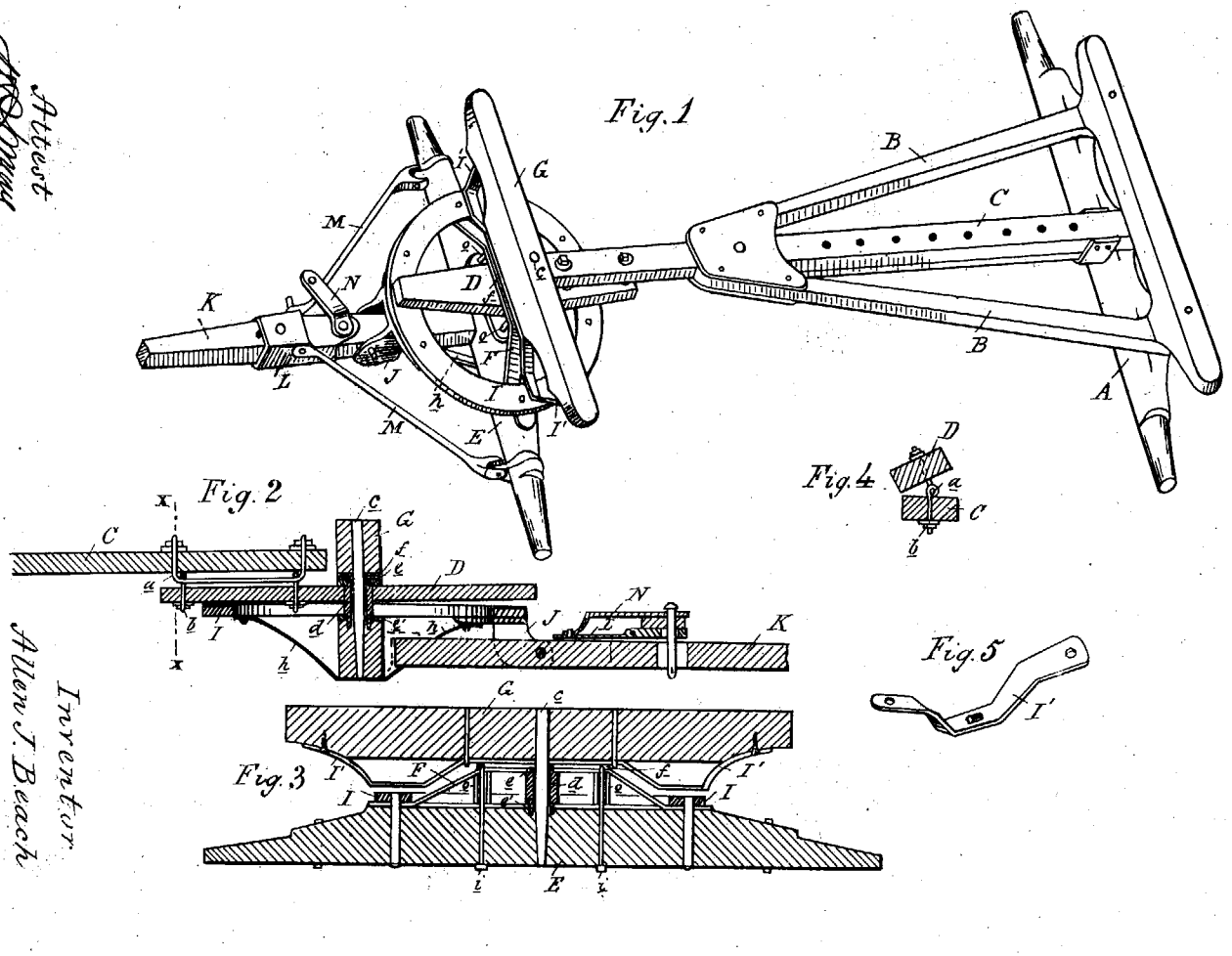
Attest
J. Paul Mayer
Inventor
Allen J. Beach
By Thos. S. Sprague Atty
N. PETERS, Photo-Lithographer, Washington, D. C.

UNITED STATES PATENT OFFICE.

ALLEN J. BEACH, OF FLINT, MICHIGAN; CLARA E. BEACH ADMINISTRATRIX OF SAID ALLEN J. BEACH, DECEASED.

RUNNING-GEAR FOR VEHICLES.

SPECIFICATION forming part of Reissued Letters Patent No. 10,679, dated January 19, 1886.

Original No. 254,104, dated February 28, 1882. Application for reissue filed February 28, 1884. Serial No. 122,384.

*To all whom it may concern:*

Be it known that I, ALLEN J. BEACH, of Flint, formerly of Linden, in the county of Genesee and State of Michigan, have invented an Improvement in Running-Gear for Wagons, of which the following is a specification.

The nature of this invention relates to certain new and novel improvements in the construction of a running-gear for wagons, and has for its object, first, to construct a reach which will obviate and do away with all of the torsional strain incident upon the ordinary construction, and which will allow of an extension or adjustment of the rear member of the running-gear to a much greater distance than can be obtained in the ordinary construction without having an elongation or projection of the reach to the rear of the wagon when the rear portion is retracted to its shortest length; second, in the peculiar formation of the front portion of the running-gear, whereby the construction is materially simplified and the ordinary sand-board, hounds, and sway-bar are done away with, and the necessity of mortising or gaining, or both, the front axle and hounds is entirely avoided; third, in the peculiar construction and arrangement of parts through which draft is applied directly to the axle and near the outer ends thereof; fourth, in the peculiar construction and means employed for hanging the tongue; and, fifth, in the peculiar construction, arrangement, and various combinations of the parts to effect the desired results, all as more fully hereinafter set forth.

Figure 1 is a perspective view of my improved gear. Fig. 2 is a vertical longitudinal section. Fig. 3 is a vertical cross-section through the forward axle and its attachments. Fig. 4 is a cross-section on the line X X in Fig. 2. Fig. 5 is a perspective view of one of the brackets which are secured to the under face of the forward bolster.

In the accompanying drawings, which form a part of this specification, A represents the rear axle of a wagon which is provided with the hounds B and extension-reach C, of the same construction as that described in Letters Patent granted to me January 29, 1878, with the exception that the said hounds are made longer than those employed in the ordinary wagon, for the reasons hereinafter given. The forward end of the reach C is secured to the rear end of the draw-bar D by means of the bail *a* and eyebolts *b*, or in any other suitable manner which will allow the reach to have a partial rolling motion under the action of the rear axle, such movement of the reach thereby avoiding all torsional strain upon the reach, as must necessarily occur where it is rigid in traveling over uneven ground or in cramping, while such movement is arrested upon either side by the reach coming in contact with the draw-bar, such locking of the reach admitting the wheels to pass over obstructions without racking or exerting any torsional strain upon any of the parts of the wagon and without danger of tipping the load—or, in other words, that action of the reach is limited to the point at which the reach and the draw-bar come in contact. This draw-bar D is secured pivotally to the forward portion of the running-gear by means of the king-bolt *c*, which also secures the bolster G in place, as is ordinary, but with this exception, that through the draw-bar D is passed a thimble, *d*, which is provided with shoulders *e e'* near each end, the latter of which rests upon the axle-plate, through which the king-bolt also passes, while the upper shoulder, *e*, serves as a support for the arched bolster-bearer F, the outer ends of which are secured to the axle by the same bolts which secure the circle I upon the axle, said circle forming a support for the outer ends of the draw-bar D, the under face of which should be provided with proper rubbing-plates, or brackets or bearings I', while a wearing-plate, *f*, is secured to the top of the bolster-bearer F to receive the wear of the bolster.

It will be observed that the fifth-wheel, while serving the purpose of a support to the draw-bar, no matter what position it may assume, also serves or performs the functions of the ordinary sway-bar employed to prevent the rolling or oscillation of the front axle, as it is evident from the construction given that it will be impossible for the forward portion of the gear to turn or roll after it has been connected to the reach. The fifth-wheel or circle is further strengthened and secured to the axle by means of the braces *h*.

To prevent the tipping or unnecessary swaying of the front bolster, I secure to the under face thereof the brackets I', (more clearly shown in Figs. 3 and 5,) which are designed to come in contact with the circle and arrest any undue side sway of the bolster, while, if desired, although I do not consider it necessary, these brackets may be provided with frictional rollers, which will come in contact or rest upon the circle, and thereby to a certain degree lessen the amount of frictional contact.

It will be observed that in addition to the support given by the thimble *d* to the bolster-bearer, it is further supported by means of thimbles *o*, which are secured to place by means of bolts *i*, which pass through the axle and the bolster-bearer and the superimposed wearing-plate.

To the front of the circle and from the under face thereof is secured a suitable hanger, J, in which is pivoted the inner end of the tongue K, which also passes through the sleeve L, upon each side of which are pivotally secured the forward ends of the draft-rods M, the rear ends of which are pivotally secured by means of proper clips to the base of the thimble-skeins upon the axle-arms, as shown.

The whiffletrees are secured to the sleeve L and beneath the free end of the hammer-strap N by means of the ordinary bolt, which passes down through an elongated hole at that point in the tongue or in any other manner, by means of which the whiffletrees may be secured to place and draft applied thereto without exerting any drawing force upon the tongue itself, while it must be seen that the rear end of the hammer-strap must be secured to the rearward projection or lip from the sleeve.

To the front face of the axle may be secured a suitable housing, O, (shown in dotted lines in Fig. 2,) to receive the rear end of the tongue K, which projects rearward through the hanger J.

By this construction and arrangement of parts it will be seen that I provide a means for entirely avoiding the torsional strain upon the reach by providing a loose connection or pivotal connection between it and the forward portion of the running-gear, while at the same time I am enabled to carry the hounds of the rear axle farther forward and nearer to the front running-gear, which admits of a greater rear extension of the rear portion of the wagon than can be had under the ordinary construction. I avoid the necessity of gaining or cutting the forward axle in any manner for the reception of hounds and sway-bar or of mortising or cutting the same to receive the forward end of the reach, while I compel the circle to perform in addition to its natural functions those of the hounds and sway-bar of the ordinary construction, while it also forms a support for the draw-bar which is secured to the reach, there being so far in the construction and arrangement of parts no liability of binding or wrenching, as there is no movement of the wagon at one point but what is compensated for at another.

It will also be seen that in the peculiar manner of securing the tongue to place I avoid the danger necessarily arising from the whipping motion of a rigid tongue as ordinarily constructed, while it has to perform no functions whatever in drawing the wagon, the draft being entirely exerted through the medium of the sleeve upon the tongue and its draft-rods, which exerts a force upon the axle at the nearest approachable point to the shoulders of the skeins, and which also governs the movements of the forward portion of the running-gear, as it has been found by actual test that the tongue performs no feature in compelling the vehicle to follow the team by reason of this application of the draft.

It will also further be seen that I am enabled to use what is ordinarily termed in the trade a "slip-tongue," and by so doing I effect a large saving in the point of manufacture, as I dispense entirely with the whole hound and slat in tongues as usually constructed, while it will still further be seen in this connection that, if desired, the rear end of such tongue may enter a housing secured to the front axle, which will admit of the use of breast-chains in contradistinction to a neck-yoke and breast-straps, thereby entirely removing the weight of the tongue upon the horses' necks.

What I claim as my invention is—

1. The reach C, pivotally secured to the draw-bar D, in combination with the circle I, below the draw-bar D, the bolster G, and the bolster-bearer F, above said draw-bar, and the bent bearing-brackets I′, secured to the bolster and adapted to act against the circle I, and the axle E, as and for the purpose specified.

2. In combination with the draw-bar D, bolster G, and axle E, the circle I, secured to the axle, and the bent bearing-plates I′, secured to the bolster and adapted to act against the circle, substantially as specified.

3. In a wagon, and in combination with the axle E thereof, the bolster-bearer F and draw-bar D, provided with the double-shouldered thimble *d*, adapted to support the center of the bolster-bearer, substantially as and for the purposes described.

4. In a wagon, and in combination with the circle I, provided with the hanger J, in which is pivotally hung the tongue K, the sliding sleeve L and draft-rods M, substantially as and for the purposes set forth,

ALLEN J. BEACH.

Witnesses:
H. S. SPRAGUE,
CHAS. J. HUNT.